United States Patent [19]

Hall

[11] Patent Number: 5,717,042
[45] Date of Patent: Feb. 10, 1998

[54] PROCESS FOR PREPARING DIENE OLIGOMERS AND COPOLYMERIC OLIGOMERS

[75] Inventor: James E. Hall, Mogadore, Ohio

[73] Assignee: Bridgestone/Firestone, Inc., Akron, Ohio

[21] Appl. No.: 281,319

[22] Filed: Jul. 28, 1994

Related U.S. Application Data

[63] Continuation of Ser. No. 696,371, May 6, 1991, abandoned.
[51] Int. Cl.$^6$ ............ C08F 2/38; C08F 4/48; C08F 36/04
[52] U.S. Cl. .......... 526/180; 526/173; 526/174; 526/179; 526/204; 526/217; 526/335; 526/340; 585/429; 585/507; 585/527
[58] Field of Search .............. 526/180, 217, 526/335, 173, 179, 204, 174; 585/429, 507, 204

[56] References Cited

U.S. PATENT DOCUMENTS

| 3,324,191 | 6/1967 | Wofford | 585/507 X |
|---|---|---|---|
| 3,678,121 | 7/1972 | McElroy et al. | 526/180 X |
| 3,776,893 | 12/1973 | Naylor et al. | 526/179 X |
| 3,887,536 | 6/1975 | Ichikawa et al. | 526/180 |
| 4,672,097 | 6/1987 | James E. Hall | 526/174 |
| 4,960,842 | 10/1990 | Lo et al. | 526/175 |

FOREIGN PATENT DOCUMENTS

| 48-17674 | 5/1973 | Japan | 526/180 |
|---|---|---|---|
| 51-8391 | 1/1976 | Japan | 526/180 |
| 826292 | 12/1959 | United Kingdom | 526/173 |
| 1153775 | 5/1969 | United Kingdom | 526/173 |

OTHER PUBLICATIONS

English translation of Japanese Kokai Pat. Appl'n No. 51-8391, published 01-23-76.
Reich et al., Polymerization By Organometallic Compounds, Interscience, N.Y., 548-9 (1996).
Nobuyoshi Imai, Tadashi Narita and Teiji Tsuruta, *Stereospecific Addition Reaction Between Butadiene and Amines*, 1971.

*Primary Examiner*—Fred Teskin
*Attorney, Agent, or Firm*—Frank J. Troy, Sr.

[57] ABSTRACT

A process and catalyst system for the preparation of diene oligomers and copolymeric oligomers is disclosed. The oligomers and copolymers are prepared in an alkane solvent from one or more 1,3-diene monomers using a secondary amine transfer agent and an anionic initiator. A catalyst system including a secondary amine transfer agent and an anionic initiator is also provided.

15 Claims, 1 Drawing Sheet

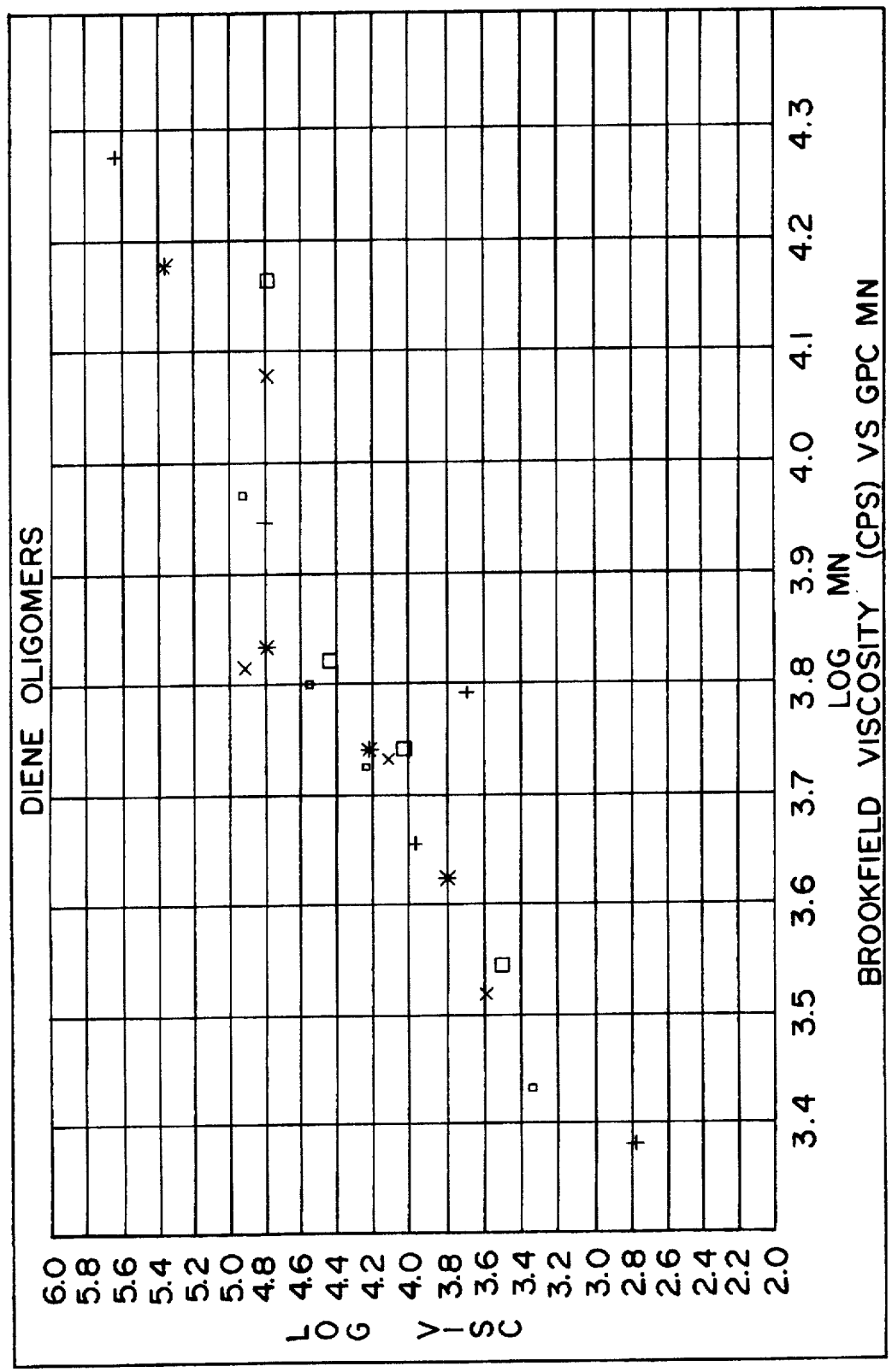

PROCESS FOR PREPARING DIENE OLIGOMERS AND COPOLYMERIC OLIGOMERS

This application is a continuation of U.S. application Ser. No. 07/696,371, filed May 6, 1991, and now abandoned, the disclosure of which is incorporated herein by reference.

FIELD OF THE INVENTION

This invention relates generally to processes for preparing diene oligomers and copolymeric oligomers and, in particular, to a process for preparing diene oligomers and diene containing copolymeric oligomers using a catalyst system including a secondary amine transfer agent and an anionic initiator.

BACKGROUND OF THE INVENTION

Use of lithium amides, such as butyl lithium or lithium dialkylamide, as initiators for anionic polymerization of dienes is known. Lithium amides are also reacted with 1,3-butadiene to prepare corresponding cis-2-butene amides. In these processes, one equivalent of anionic initiator is required for each equivalent of polymer since each equivalent of initiator corresponds to a polymer chain end. The average molecular weight of the polymer can be calculated from the molecular weight of the monomer and the number of equivalents of initiator.

It is, however, difficult to carry out processes using lithium amides in alkane solvents since most Group I and Group II metal dialkylamides are insoluble in alkanes and crystallize out of solution. For this reason, lithium amides are inefficient initiators for anionic polymerization.

Oligomerization systems using tetramethyl-ethylene diamine (TMEDA) and an alkyllithium initiator are also known. In these systems, the TMEDA activates the alkyllithium initiator. However, these systems require the use of toluene or similar aromatic compound as a solvent and transfer agent, which is considered to be disadvantageous.

It is desirable to provide a system for preparing polydiene oligomers and diene containing copolymers in an alkane solvent without using an equivalent amount of anionic initiator for each equivalent of polymer prepared.

SUMMARY OF THE INVENTION

A process and catalyst system for the preparation of polydiene oligomers and diene containing copolymeric oligomers is disclosed. The polydiene and copolymeric oligomers are prepared in an alkane solvent from one or more 1,3-diene monomers using a catalytically effective amount of secondary amine transfer agent in combination with an anionic initiator. The number of polymer chain ends produced by the present process is equal to the number of equivalents of transfer agent plus the number of equivalents of anionic initiator initially added to the monomer system. The reaction is preferably carried out as a "semi-batch" process or "starved feed" process. A catalyst system using a secondary amine transfer agent and an anionic initiator is also provided.

It is an object of the invention to provide a process for preparing diene oligomers and copolymers that requires less than one equivalent of anionic initiator per equivalent of polymer.

It is another object of the invention to provide a process for preparing diene oligomers and copolymers in an alkane solvent.

It is a further object of the invention to provide a semi-batch process for preparing diene oligomers and copolymers.

It is yet another object of the invention to provide a catalyst system for use in preparing diene oligomers and copolymers in an alkane solvent.

It is a further object of the invention to produce an oligomer containing tertiary amine end-groups.

DESCRIPTION OF THE FIGURES

FIG. 1 displays the viscosity of the resulting oligomers in relationship to their molecular weight.

DETAILED DESCRIPTION OF THE PREFERRED EMBODIMENTS

The diene and copolymeric oligomers prepared in accordance with the invention are prepared from one or more conjugated dienes. Polymerizable 1,3-diene monomers that can be employed in the production of the oligomers and copolymers of the present invention are one or more 1,3-conjugated dienes containing from four to twelve, inclusive, carbon atoms per molecule. Exemplary monomers include 1,3-butadiene; isoprene; 2,3-dimethyl-1,3-butadiene; 1,3-pentadiene(piperylene); 2-methyl-3-ethyl-1,3-butadiene; 3-methyl-1,3-pentadiene; 1,3-hexadiene; 2-methyl-1,3-hexadiene; 3-butyl-1,3-octadiene, and the like. Among the dialkyl-1,3 butadienes, it is preferred that the alkyl groups contain from one to three carbon atoms. The preferred 1,3-diene monomer for use in the process of the present invention is 1,3-butadiene. The conjugated diene is used in an amount of from 40 to 100 parts by weight.

In addition to the above described conjugated dienes, 0 to 60 parts by weight of one or more suitable copolymerizable monomers such as vinyl-substituted aromatic monomers can be incorporated into the polymerization mixture per 40 to 100 parts by weight of the conjugated diene monomers. Examples of suitable copolymerizable monomers for use in the preparation of copolymers in the present invention include: styrene; alpha-methylstyrene; 1-vinylnaphthalene; 2-vinylnaphthalene; 1-alpha-methylvinylnaphthalene; 2-alpha-methylvinylnaphthalene; 1,2-diphenyl-4-methylhexene-1; 1,6-diphenyl-hexadiene-1,5; 1,3-divinylbenzene; 1,3,5-trivinylbenzene; 1,3,5-triisopropenylbenzene; 1,4-divinylbenzene; 1,3-distyrylbenzene; 1,4-distyrylbenzene; 1,2-distyrylbenzene; and mixtures of these as well as alkyl, cycloalkyl, aryl alkaryl and aralkyl derivatives thereof in which the total number of carbon atoms in the combined hydrocarbon constitutes generally not greater than 12. Examples of these latter compounds include: 4-methylstyrene; vinyl toluene; 3,5-diethylstyrene; 2-ethyl-4-benzylstyrene; 4-phenylstyrene; 4-p-tolylstyrene; 2,4-divinyltoluene; 4,5-dimethyl-1-vinylnaphthalene; 2,4,6-trivinyltoluene; and 2,4,6-triisopropenyl-toluene. The preferred aromatic monomer is styrene.

The monomer is provided to the reaction vessel in an inert organic diluent. Many suitable inert diluents are known in the art. Preferred diluents generally include alkanes and cycloalkanes such as ethane, propane, iso- and n-butane, iso- and n-pentane, iso- and n-hexane, iso- and n-heptane, iso- and n-octane, cyclobutane, cyclopentane, cyclohexane, cycloheptane and cyclooctane. Preferred diluents are iso- and n-hexane. The diluents can be employed either alone or in admixture. The concentration of monomer in diluent can range from 5 to 60 wt. percent or more and is generally dependent upon economics and the ability to control reaction conditions and to handle the polymer solution.

A secondary amine transfer agent is used to control the molecular weight of the diene oligomers and copolymers prepared in accordance with the process of the invention. One equivalent of secondary amine transfer agent corresponds to a polymer chain end. Consequently, a tertiary amine end group is provided on one polymer chain end of each polymer chain. Suitable secondary amine transfer agents include, but are not limited to dialkyl amines having the structure:

wherein $R_1$ and $R_2$ represent hydrocarbyl radicals having from one to eight carbon atoms. $R_1$ and $R_2$ are independently selected and may be the same or different. Preferred transfer agents include, but are not limited to, diisobutylamine, di-n-butyl amine and the like. $R_1$ and $R_2$ can be linked together to form cyclic secondary amines having from four to eight carbon atoms and are also useful transfer agents in the process of the invention. Preferred cyclic secondary amine transfer agents include, but are not limited to, piperidine, pyrrolidine, and the like.

Any anionic initiator system, known in the art as useful in the polymerization of 1,3-diene monomers, can be employed in the process of the instant invention. Suitable organolithium catalysts include lithium compounds having the formula $R(Li)_x$, wherein R represents a hydrocarbyl radical of 1 to 20, preferably 2 to 8 carbon atoms per R group and x is an integer from 1 to 4. Typical R groups include aliphatic radicals and cycloaliphatic radicals, such as alkyl, cycloalkyl, cycloalkylalkyl, alkylcycloalkyl, aryl and alkylaryl radicals. Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include: p-tolyllithium, 4-phenylbutyl-lithium, 4-butylcyclohexyllithium, 4-cyclohexylbutyl-lithium, lithium dialkyl amines, lithium dialkylphosphines, lithium alkyl aryl phosphines, lithium diaryl phosphines and the like.

Other suitable anionic initiators include alkali metal trihydrocarbyl magnesiates that are either sodium or potassium trihydrocarbyl magnesiate compounds which are represented by the structural formula:

wherein M is Na or K, and $R_1$, $R_2$ and $R_3$ are independently selected from the group consisting of a $C_1$–$C_{14}$ hydrocarbon organo radical. These $C_2$–$C_{14}$ organo radicals may be alkyl, aryl, cycloalkyl, cycloalkenyl-alkyl, aryl-alkyl, aryl-cycloalkyl, cycloalkylaryl, or ethylenically unsaturated organo radicals such as vinyl, allyl and propenyl.

The preferred organo radicals $R_1$, $R_2$ and $R_3$ which can be employed in the present invention are n-hexyl, n-butyl, s-butyl, 2-ethylhexyl and n-octyl.

The preferred $MR_1R_2R_3Mg$ compounds for use in the present invention include sodium tri-n-hexyl magnesiate, sodium tributyl magnesiate, sodium dibutylhexyl magnesiate, and sodium butyl-octyl-2-ethylhexyl magnesiate. Mixtures of different sodium or potassium trihydrocarbyl magnesiates can be employed in the instant anionic initiation system.

Mixtures of different anionic initiators can also be employed. The preferred catalysts for use in the present invention are n-butyllithium and sodium n-butyl-n-octyl-2-ethylhexyl magnesiate and mixtures thereof.

The milliequivalent ratio of the anionic initiator to the weight of monomers which are employed in the preparation of oligomers or copolymers of the present invention ranges between 0.2 to 10 millimoles of anionic initiator per hundred grams of monomer.

Each equivalent of anionic initiator generally corresponds to a polymer chain end. The total number of polymer chain ends in general is equal to the number of equivalents of transfer agent plus the number of equivalents of anionic initiator. The molecular weight of the polymer is a direct proportional function of the total number of equivalents of transfer agent and initiator. The presence of impurities and various side reactions can eventually deactivate the growing anionic oligomeric chain ends which will skew molecular weight calculations and results. The molar ratio of transfer agent (telogen) to anionic initiator can range from 1:4 to 40:1, preferably 4:1 to 20:1.

The diene oligomers and copolymers prepared in accordance with the process of the invention generally have a number average molecular weight ranging from about 500 to 50,000, preferably from 700 to 20,000 and more preferably from 5,000 to 15,000. The desired molecular weight is readily attained by controlling the equivalents of secondary amine transfer agent and anionic initiator used in the process. These oligomers and copolymeric oligomers also contain 10% to 70% of 1,2-microstructive or vinyl content in the diene contributed units.

As used herein, the term "semi-batch" or "starved feed" refers to a process wherein reactants are fed to a reaction vessel as the reaction proceeds so that only small amounts of unreacted reactants are present in the reaction vessel at any time. The reactor set-up can include a transfer tank that is used to maintain one or more reaction components prior to transfer to a reaction vessel. The transfer tank is of a type that can be maintained under pressure.

Suitable flow means are provided to permit the contents of the transfer tank to be transferred to the reaction vessel. A flow gauge in the flow means permits the flow rate of the contents of the transfer tank through the flow means to be observed. In addition, a micrometering valve is provided on the flow means for controlling the rate of flow.

The reaction vessel includes suitable means for heating the reaction vessel to a predetermined desired temperature. In addition, the reaction vessel includes screws or paddles for providing constant agitation to the contents of the vessel. A drop valve for transporting the diene and copolymeric oligomers from the reaction vessel is also provided.

To carry out the process of the invention, one or more diene monomers in an alkane solvent is charged to the transfer tank. A vinyl substituted aromatic monomer may also be added. The secondary amine transfer agent is also charged to the transfer tank and the tank is pressurized to a pressure between about ½ and 100 atmospheres with nitrogen or other inert gas such as argon. It is desirable to maintain a positive pressure differential between the transfer tank and the reaction vessel throughout the process of the invention.

The anionic initiator in sufficient alkane solvent to effect stirring is charged to the reaction vessel and the reaction vessel is heated to a desired temperature. In general, the desired temperature will be between about 50° and 160° C., preferably between 90° and 120° C.

When the desired temperature has been achieved in the reaction vessel, transfer of the contents of the transfer tank to the reaction vessel is begun. The transfer is carried out at a steady rate that is temperature dependent. In general, the advantage of using a semi-batch process is that the reactants are used up as they are transferred to the reaction vessel, thereby allowing the calculated molecular weight to be more readily achieved. Further, the tendency of lithium amides to crystallize out of solution is prevented. Therefore, the addition rate is adjusted to permit the reactants to be used up and may need to be readjusted as the process proceeds. The micrometering valve controls the flow rate and the flow gauge permits the flow rate to be observed. Adjustments in the flow rate can be made as the pressure in the reaction vessel rises as it fills. The diene oligomers and copolymers are obtained in a concentration ranging from 5 to 60% solids in solution and are withdrawn through a drop valve in the reaction vessel.

The following examples are presented for purposes of illustration only and are not to be construed in a limiting sense. In the following examples the value calculated for the chain transfer efficiency (CTE) represents the percentage of secondary amine transfer agent that initiated new polymer chains. In polymerizations wherein the anionic initiator contains $MR_1R_2R_3Mg$ each millimole of this initiator contains three milliequivalents. The $M_n$ is calculated by gel permeation chromatography.

The chain transfer efficiency (CTE) was calculated using the equation:

$$C.T.E.=[(C-I)/SA]\times 100$$

wherein,

SA is the number of milliequivalents of secondary amine;

I is the number of milliequivalents of anionic initiator charged; and,

C is the calculated number of milliequivalents of initiator based on the formula:

C=(milligrams of polymer yield)/$M_n$.

EXAMPLE 1

Two lbs of 25% solution of 1,3-butadiene monomer in hexane was charged to a transfer tank. Twelve mmoles of piperidine was added to the mixture and the tank was pressurized using $N_2$. Separately, 1.5 mmoles sodium n-butyl-n-octyl-2-ethylhexyl magnesiate and 1.5 mmoles of n-butyl lithium was charged to a one-half gallon stainless steel reaction vessel. The vessel was heated to a temperature of 94° C. and stirring was initiated. The contents of the transfer tank were continuously transferred to the reaction vessel over a period of 24 min. The temperature of the reaction vessel during the reaction ranged from 88° to 102° C. A polybutadiene oligomer having a number average molecular weight $M_n$ of 15,000 and 35% 1,2-diene groups (vinyl content) was recovered. The percent yield was 99% and the chain transfer efficiency (C.T.E.) was 73%.

EXAMPLES 2-13

Examples 2 through 13 were carried out using the procedure described in Example 1.

Examples 2 and 3 utilized 1.75 mmoles of n-butyllithium and 1.75 milliequivalents of sodium-n-buty-n-octyl-ethylhexyl magnesiate. Examples 4 and 5 utilized 5.0 and 1.5 millimoles of n-butyllithium and 5.0 and 1.5 milliequivalents of sodium-n-butyl-n-octyl-ethylhexyl magnesiate, respectively. Example 6 used 20 mmoles of n-butyllithium and in Examples 7–9, 3 mmoles of n-butyllithium was used as the initiator. In all examples the amount of secondary amine transfer agent (telogen) was varied to give telogen/R ratios ranging from 4/1 to 20/1.

Example 10 is a comparative example showing use of an initiator including 4.5 mmole of n-butyllithium and 4.5 mmole of TMEDA. The ratio of telogen/R was 10/1.

Examples 11 through 13 were also carried out using the same procedure except that the initial charge to the reaction vessel included a total of 2 lbs of 33.4% styrene in hexane and 24.4% 1,3-butadiene in hexane.

Example 11 used 3 mmoles of n-butyllithium as the initiator and sufficient pyrrolidine telogen to give a telogen/R ratio of 12/1. Example 12 used 0.75 mmoles of n-butyllithium and an equal number of mmoles of sodium n-butyl-n-octyl-ethylhexyl magnesiate as the anionic initiator. Sufficient pyrrolidine telogen was used to give a telogen/R ratio of 12/1.

Example 13 is a comparative example using 4.5 mmoles of N-butyllithium, and 4.5 mmoles of TMEDA as the anionic initiator. Sufficient pyrrolidine telogen was used to provide a telogen/R ratio of 10/1.

For each of Examples 2–13, the contents of the transfer tank were transferred to the reaction vessel over the following periods of time:

| EXAMPLE NO. | TIME (min) |
| --- | --- |
| 2 | 27 |
| 3 | 32 |
| 4 | 43 |
| 5 | 43 |
| 6 | 38 |
| 7 | 25 |
| 8 | 33 |
| 9 | 21 |
| 10 | 42 |
| 11 | 24 |
| 12 | 24 |
| 13 | 38 |

The results obtained in all of Examples 1 through 13 are shown in TABLE 1.

TABLE 1

| | | POLYBUTADIENE OLIGOMERS | | | | | | |
| --- | --- | --- | --- | --- | --- | --- | --- | --- |
| EXAMPLE NO. | TELOGEN | INITIATOR | TELOGEN/R | TEMP °C. | % YIELD | Mn | C.T.E. | VINYL CONTENT |
| 1 | PIPERDINE | RLi-NaR$_3$Mg | 4 | 94 | 99 | 15,000 | 73% | 35 |
| 2 | PIPERDINE | RLi-NaR$_3$Mg | 5 | 115 | 98 | 8,800 | 94% | 35 |
| 3 | PIPERDINE | RLi-NaR$_3$Mg | 15 | 113 | 100 | 3,300 | 97% | 38 |
| 4 | PYRROLIDINE | RLi-NaR$_3$Mg | 20 | 93 | 65 | 1,000 | 53% | 41 |
| 5 | DIISOBUTYLAMINE | RLi-NaR$_3$Mg | 15 | 91 | 78 | 4,400 | 69% | 36 |

TABLE 1-continued

| | | | | | | | | |
|---|---|---|---|---|---|---|---|---|
| 6 | PYRROLIDINE | nBuLi | 7.5 | 100 | 63 | 700 | 100% | 18 |
| 7 | PYRROLIDINE | nBuLi | 10 | 107 | 92 | 6,800 | 66% | 17 |
| 8 | PIPERIDINE | nBuLi | 20 | 114 | 92 | 3,500 | 61% | 18 |
| 9 | DI-N-BUTYL AMINE | nBuLi | 15 | 91 | 54 | 4,200 | 47% | 14 |
| 10 | PYRROLIDINE | nBuLi TMEDA | 10 | 91 | 100 | 4,000 | 84% | 60 |

| STYRENE/BUTADIENE OLIGOMERS | | | | | | | | |
|---|---|---|---|---|---|---|---|---|
| EXAMPLE NO. | TELOGEN | INITIATOR | TELOGEN/R | TEMP °C. | % YIELD | Mn | C.T.E. | % STYRENE |
| 11 | PYRROLIDINE | nBuLi | 12 | 93 | 63 | 2,400 | 75% | 26 |
| 12 | PYRROLIDINE | RLi-NaR₃Mg | 12 | 94 | 100 | 3,600 | 97% | 44 |
| 13 | PYRROLIDINE | nBuLi TMEDA | 10 | 91 | 79 | 1,400 | 196% | 27 |

It is noted that the addition of tetramethylethylenediamine to the lithium based anionic initiators in Examples 10 and 13 resulted in an increase in 1,2-addition reactions other than those caused by the presence of the secondary amine as can be observed by the presence of 60% of 1,2-vinyl groups in Example 10 and 51% 1,2- vinyl groups in Example 13. The percentage of 1,2 vinyl groups effects the glass transition temperature of the polymers, their blending characteristics and other physical properties.

As displayed in FIG. 1, the log of the brookfield viscosity measured in centipoises at 25° C. for diene and copolymeric oligomers prepared in accordance with the process of the invention increases linearly as a function of the log of the number average molecular weight and serves to demonstrate the versatility of the process. At the low end of the range are polymers with a molecular weight of about 2,500 which are only slightly more viscous than water; at the high end, polymers having a molecular weight of 20,000 are extremely viscous, like molasses. The oligomers and copolymers prepared in accordance with the process of the invention are useful as adhesives and in other applications wherein blending and mixing properties are important.

I claim:

1. A process for preparing oligomers comprising contacting 40 to 100 parts by weight of at least one monomer of a conjugated diene having 4 to 12 carbon atoms per molecule and 0 to 60 parts by weight of at least one monomer of a vinyl-substituted aromatic hydrocarbon having from 8 to 20 carbon atoms per molecule with an anionic initiation system selected from the group consisting of MR₁R₂R₃Mg wherein M is Na or K and R₁, R₂, and R₃ are independently selected from the group consisting of hydrocarbyl radicals of 1 to 14 carbon atoms, or an organolithium compound having the formula R(Li)ₓ wherein R represents a hydrocarbyl radical of 1 to 20 carbon atoms selected from the group consisting of alkyl, cycloalkyl, cycloalkylalkyl, alkylcycloalkyl, aryl and alkylaryl radicals and x is an integer of 1–4, lithium dialkyl amines, lithium dialkyl phosphines, lithium alkyl aryl phosphines and lithium diaryl phosphines or mixtures thereof; and a secondary amine transfer agent to cause formation of said oligomers and recovering said oligomers, said secondary amine transfer agent comprising:

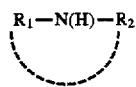

wherein R₁ and R₂ are independently selected from hydrocarbyl radicals having from 1 to 8 carbon atoms or R₁ and R₂ are linked together to form a heterocyclic compound containing 4 to 8 carbon atoms and wherein said process is performed in a diluent consisting essentially of an inert organic diluent selected from the group consisting of ethane, propane, isobutane, n-butane, isopentane, isohexane, n-hexane, isoheptane, n-heptane, isooctane, n-octane, cyclobutane, cyclopentane, cyclohexane, cycloheptane, cyclooctane and mixtures thereof, wherein the molar ratio of the secondary amine transfer agent to the anionic initiator ranges between 4:1 to 20:1.

2. The process of claim 1 wherein the conjugated diene is 1,3-butadiene.

3. The process of claim 1 wherein the conjugated diene is 1,3-butadiene and the vinyl-substituted aromatic hydrocarbon is styrene.

4. The process of claim 1 wherein the anionic initiator is present in an amount ranging from 0.2 to 10 milliequivalents per hundred grams of monomer.

5. The process of claim 1 wherein the secondary amine transfer agent is piperidine.

6. The process of claim 1 wherein the secondary amine transfer agent is pyrrolidine.

7. The process of claim 1 wherein the secondary amine transfer agent is diisobutylamine.

8. The process of claim 1 wherein the inert organic diluent is hexane.

9. The process of claim 1 wherein the process is carried out at a temperature between about 90° and 120° C.

10. The process of claim 1 wherein the monomers are polymerized using a semi-batch process.

11. The process of claim 1 wherein the oligomers have a molecular weight of between about 500 and 50,000.

12. The process of claim 1 wherein the oligomers have a 1,2-microstructure in the diene contributed units ranging between 10% and 70%.

13. A process for preparing oligomers in an inert organic diluent comprising contacting 40 to 100 parts by weight of at least one monomer of a conjugated diene having 4 to 12 carbon atoms per molecule and 0 to 60 parts by weight of a vinyl-substituted aromatic hydrocarbon having from 8 to 20 carbon atoms per molecule with an anionic initiation system selected from the group consisting of MR₁R₂R₃Mg wherein M is Na or K and R₁, R₂, and R₃ are independently selected from the group consisting of hydrocarbyl radicals of 1 to 14 carbon atoms, or an organolithium compound having the formula R(Li)ₓ wherein R represents a hydrocarbyl radical of 1 to 20 carbon atoms selected from the group consisting of alkyl, cycloalkyl, cycloalkylalkyl, alkylcycloalkyl, aryl and alkylaryl radicals and x is an integer of 1–4, lithium dialkyl amines, lithium dialkyl phosphines, lithium alkyl aryl phosphines and lithium diaryl phosphines or mixtures thereof; and a secondary amine transfer agent to cause formation of said oligomers, said secondary amine transfer agent comprising:

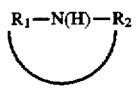

wherein $R_1$ and $R_2$ are linked together to form a heterocyclic compound containing 4 to 8 carbon atoms, wherein the molar ratio of the secondary amine transfer agent to the anionic initiator ranges between 4:1 to 20:1.

14. The process of claim 13 wherein the secondary amine transfer agent is piperidine.

15. The process of claim 13 wherein the secondary amine transfer agent is pyrrolidine.

* * * * *